United States Patent [19]
Ito

[11] Patent Number: 4,807,656
[45] Date of Patent: Feb. 28, 1989

[54] FUEL-EFFUSION PREVENTION VALVE SYSTEM AND A DEVICE THEREFOR

[75] Inventor: Shoji Ito, Nagoya, Japan

[73] Assignees: Aisin Seiki Kabushiki Kaisha, Kariya; Toyota Jidosha Kabushiki Kaisha, Toyota, both of Japan

[21] Appl. No.: 163,603

[22] Filed: Mar. 3, 1988

Related U.S. Application Data

[63] Continuation-in-part of Ser. No. 928,857, Nov. 10, 1986, abandoned.

[30] Foreign Application Priority Data

Nov. 11, 1985 [JP] Japan .................. 60-173367

[51] Int. Cl.⁴ ............................. F16K 17/36
[52] U.S. Cl. ....................................... 137/43
[58] Field of Search ...................... 137/38, 43

[56] References Cited

U.S. PATENT DOCUMENTS 3,698,160 10/1972 Hunter .................. 137/43 X
4,050,471 9/1977 Anhegger .................. 137/43 X
4,095,609 6/1978 Martin .................. 137/43

Primary Examiner—Robert G. Nilson
Attorney, Agent, or Firm—Oblon, Fisher, Spivak, McClelland & Maier

[57] ABSTRACT

A valve device for preventing fuel effusion from a fuel tank, including a casing having an inlet port in the forward position and an outlet port in the rearward position for evaporated fuel, a valve body disposed in a casing so as to be movable in the direction along the axis line connecting the inlet port and the outlet port so that it can interrupt the communication between the inlet port and the outlet port, a steel ball disposed in the valve body so as to be movable rollingly in the direction of said axis, thereby moving the valve body by the rolling action. The axis is arranged so as to be slanted by a specific angle with respect to the horizontal direction of a vehicle body, thereby making it possible for the valve body not to maintain the communicaiton interruption between the inlet port and the outlet port when the fuel level variation in the fuel tank becomes remarkable. The valve device may be connected to one end of a ventilation pipe of which another end is provided with a charcoal canister communicating with outside air and an intake manifold.

3 Claims, 2 Drawing Sheets

FUEL-EFFUSION PREVENTION VALVE SYSTEM AND A DEVICE THEREFOR

This is a Continuation-in-Part Application of U.S. Application Ser. No. 06/928,857 filed Nov. 10, 1986, now abandoned.

BACKGROUND OF THE INVENTION

1. Field of the Invention

The present invention relates to a valve system for preventing effusion of fuel from the fuel tank and a valve device used therefor, more particularly to a device and a system for preventing the outflow of fuel from the fuel tank when a vehicle is accelerated, decelerated, makes a turn, ascends or descend a slope.

2. Description of the Prior Art

One of the conventional devices of this type is disclosed in the specification of U.S. Pat. No. 3,910,302, which is shown in FIG. 4. This device is provided in a fuel tank 30 so as to directly sense the change of the fuel level in the fuel tank which changes depending on the condition when a vehicle is accelerated, decelerated, makes a turn, ascends or descends a slope.

A cylindrical valve case 34 that forms a valve chamber 33, in which a cylindrical float valve 32 is fitted afloat, is joined to the end of a pipe 31 that communicates with a charcoal canister. A conical seat surface 36, to which a spherical seal 32 of the top end of the float valve 32 can be brought into contact, is provided on the top surface of the valve case 34. Several small holes, through which fuel flows into said case, are provided in the bottom surface or the side surface. Several ribs 35, which control the movement of the float valve 32 in the radial direction, are provided on the outer peripheral surface of the float valve 32.

When the liquid level in the fuel tank 30 changes at the time of acceleration, deceleration, climbing, descending or turning and fuel flows into the valve case 32, the float valve is subject to buoyancy and a spherical seal 32a at the top of the valve 32 comes into contact with seat the surface 34a of case 34 to prevent the fuel from flowing out of the tank.

In the conventional device mentioned above, the fuel that has flowed into the valve case subjects the float valve to buoyancy and prevents the fuel from flowing out of the tank. However, there is a possibility that the float valve does not contact the underside of the valve case under its own weight because of the action of surface tension of the fuel that has flowed out into the valve case even when the liquid level is stable and interruption of communication between the fuel tank and the charcoal canister is maintained. Such condition involves problems in that the evaporated fuel pressure in the fuel tank tends to rise so as to damage the seal of the fuel tank cap, or the evaporated fuel pressure in the fuel tank tends to be lowered due to the lowering of the liquid level as fuel is consumed, to deform the tank.

SUMMARY OF THE INVENTION

The object of the present invention is to provide a fuel effusion prevention valve device in which the interruption of communication between the fuel tank and the charcoal canister is not maintained by the fuel effusion into the valve case. In accordance with the present invention, a valve device is provided and which includes a valve body having a spherical valve and disposed in the casing movably in the axial direction of the evaporated fuel inlet port and outlet port, a steel ball having accommodated in said valve body so as to be rollable in the axial direction of said inlet port and outlet port, said valve body being movable in said axial direction with the steel ball, and said casing being fixed to the vehicle by inclining the position of the inlet port downwardly with respect to the position of the outlet port so that the rolling direction of said steel ball inclines by a specified angle to the horizontal direction of the vehicle.

Since the rolling direction of the steel ball accommodated in the valve body has the specified angle to the horizontal direction of the vehicle, the steel ball rolls under its own weight toward the evaporated fuel outlet owing to the inclination of the vehicle so as to push the valve body and bring the spherical valve of the valve body into contact with said outlet port when the vehicle is climbing or descending on a slope having an angle of inclination greater than the specified angle, the fuel is prevented from flowing out of the tank. Also, when the vehicle is accelerated or decelerated and the steel ball is subject to an acceleration force higher than a predetermined level, the ball begins to roll by overwhelming its own weight and pushes the valve body so as to bring the spherical valve of the valve body into contact with the evaporated fuel outlet port of the valve body, whereby the outflow of fuel from the tank is prevented. Here, the fuel that has flowed into the casing causes surface tension among the steel ball, the valve body and the casing, and works to maintain each portion in a position where the communication between the fuel tank and the canister is shut off. But the steel ball rolls under its own weight toward the evaporated fuel inlet port to push the valve body, thereby separating the spherical valve of the valve body from the evaporated fuel outlet port to make the charcoal canister and the fuel tank communicate with each other.

The foregoing and other objects, features and advantages of the present invention will be understood more clearly and fully from the following detailed description of preferred embodiments with reference to the attached drawings.

DESCRIPTION OF THE PREFERRED EMBODIMENTS

Figure 1:
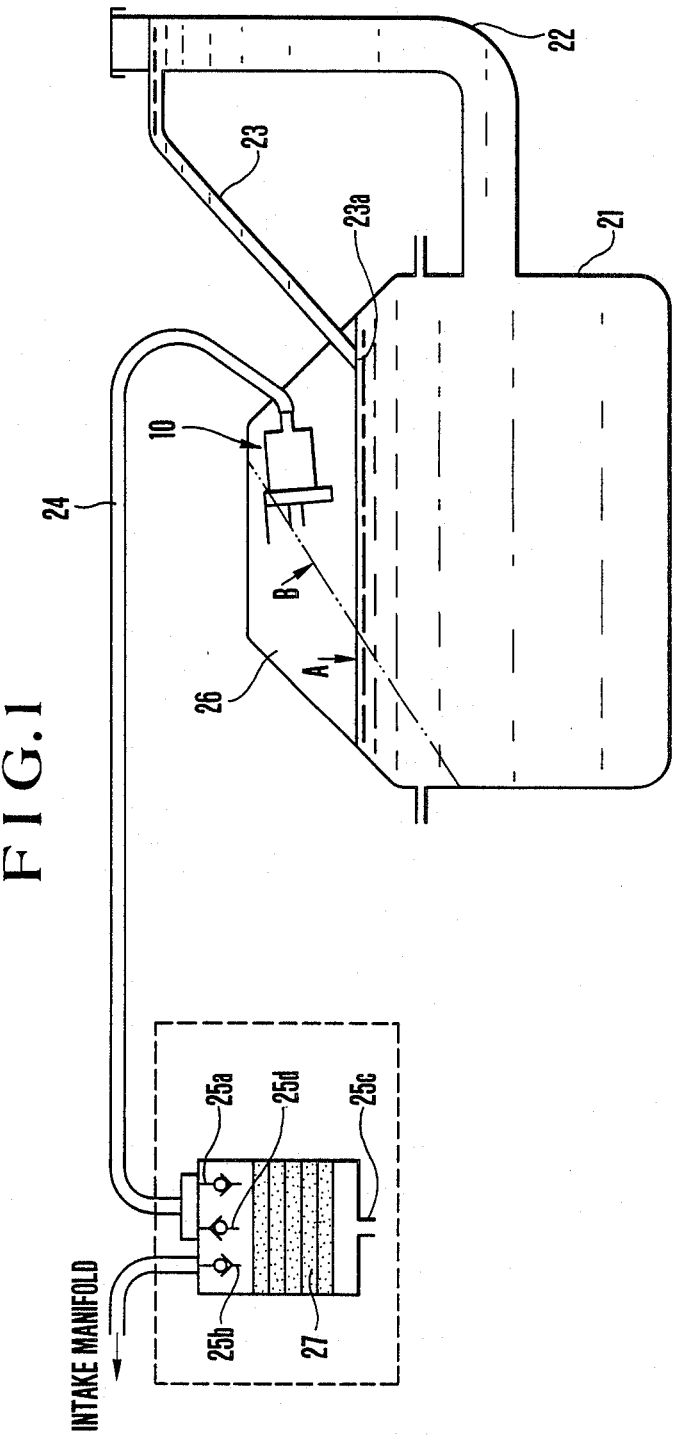
FIG. 1 shows an embodiment of fuel effusion prevention system in accordance with the present invention.

The fuel effusion prevention valve system shown in FIG. 1 has a fuel tank 21 equipped with a filler pipe 22 for supplying fuel. A breather pipe 23, of which one end is connected to the filler pipe 22, is connected to the upper portion of the fuel tank 21 so that the other end 23a is positioned in the inside of the fuel tank 21, whereby the storaged fuel quantity in the fuel tank 21 is regulated to be at a level A at which the one end 23a of the breather pipe 23 is positioned and an air chamber 26 is formed in the upper portion of the inside of the fuel tank 21. One end of a ventilation pipe 24, of which another end is connected to ports 25a and 25d of a charcoal canister 25, is disposed in the air chamber 26 so as to make the air chamber 26 to communicate with outside air. A charcoal canister 25 has a body equipped with ports 25a and 25d, a suction port 25b connected an intake manifold (not shown) and a port 25c communicating with outside air. Adsorption material 27 of activated carbon is accommodated in the body. The ports 25a and 25d of the charcoal canister 25 work to be closed by the function of check valves when the pressure in the air chamber 26 becomes higher than outside air pressure.

When the liquid surface in the fuel tank 21 does not reach the height of the pipe end 23a of the breather pipe 23, fuel can be poured into the fuel tank 21 through the filler-pipe 22 as the air chamber 26 communicates with outside air. But, when the liquid surface reaches the pipe end 23a and the pressure in the air chamber 26 becomes higher than outside air pressure, it becomes impossible to pour fuel into the fuel tank 21 through the filler-pipe 22, as the breather pipe 23 does not communicate with outside air. Thus, the breather pipe 23 controls the fuel quantity in the fuel tank 21. When the pressure in the air chamber 26 increases unusually to reach a predetermined degree, the ports 25 and 25d act to be opened by the function of check valves and outside air is introduced to the air chamber 26. Thus the unusual increase of pressure in the air chamber 26 is prevented.

A fuel effusion prevention valve device 10 is attached to one end of the ventilation pipe 24 in air chamber 26 in the upper portion of fuel tank 21. During normal vehicle running when the surface level of fuel storaged in the fuel tank 21 does not vary greatly, evaporated fuel flows into the charcoal canister 25 through the fuel effusion prevention valve device 10 and the ventilation pipe 24 to be adsorbed by the adsorption material 27. At the time of engine starting, the evaporated and adsorbed fuel is sucked into an intake manifold to improve the engine start condition. During vehicle running on a slope or at the time of acceleration, deceleration or vehicle turning, when the surface level of fuel varies greatly to reach a B level, the fuel effusion prevention valve device operates so as to interrupt the communication between the ventilation pipe 24 and the air chamber 26 and prevents fuel effusion to the outside of fuel tank 21.

Figure 2:
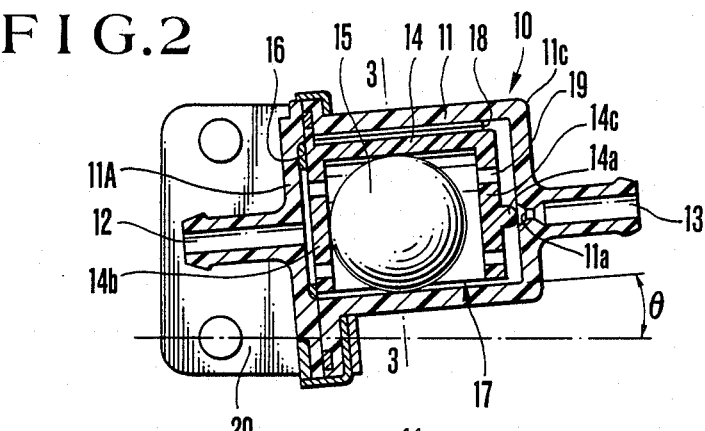
FIG. 2 shows a sectional view of an embodiment of a fuel effusion prevention valve device in accordance with the present invention.
Figure 3:
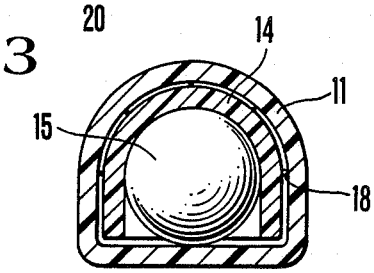
FIG. 3 shows an enlarged cross sectional view taken on line 3—3 of FIG. 2.
Figure 4:
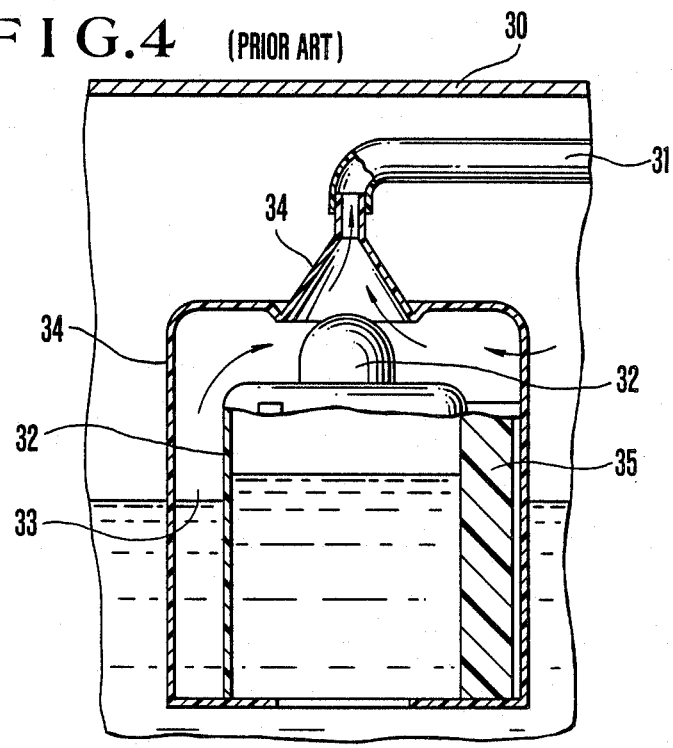
FIG. 4 shows a sectional view of an example of conventional fuel effusion prevention valve device.

Referring to FIG. 2 and FIG. 3, the fuel effusion prevention valve 10 has a casing 11, the casing 11 being equipped with an evaporated fuel inlet port 12 that is formed on a front wall 11b and communicates with the fuel tank 21 and an evaporated fuel outlet port 13 that is formed on a rear wall 11c and communicates with the charcoal canister 25, and a valve chamber 17 being formed between the inlet port 12 and the outlet port 13. The inlet port 12 and the outlet port 13 are located on the same axis. The valve chamber 17 houses a valve body 14 which is movable in the axial direction of the inlet port 12 and the outlet port 13. The valve body 14 has a front wall 14b, a rear wall 14c and a spherical valve 14a formed on the surface of the rear wall 14c. A steel ball 15 is fitted movably in valve body 14 to be rollable in the same axial direction.

Also, a stopper mechanism 16 that controls the movement of the valve body 14 toward the inlet is provided on the end surface having inlet port 12 of the valve chamber 17, and a conical valve seat 11a to which a spherical valve 14a of the valve body 14 can be fitted is formed at the outlet port 13 provided on the same axis as that of the inlet port 12 on the opposite side of said end surface, and five ribs are provided on the outside surface of the valve body 14 which is a contact surface with the inside surface of casing 11 to reduce the contact area and friction resistance.

The fuel effusion prevention valve 10 is fixed to the vehicle with a fixing member 20 so that the inlet port 12 is positioned in the forward direction of the vehicle and inclines downwardly by a specified angle $\theta$ with respect to the horizontal line of the vehicle.

In normal travel when the liquid level in the fuel tank 21 does not vary greatly, the valve body 14 is pushed by the weight of steel ball 15 to contact the stopper 16, and the evaporated fuel in the fuel tank 21 goes from the inlet port 12 to the charcoal canister 25 through the outlet port 13 to be adsorbed after passing through several small holes 19 in the two end surfaces facing the inlet port 12 and the outlet port 13 in the valve body 14 and through the gap between the outer periphery surface of the valve body 14 and the inner periphery surface of casing 11.

When the angle of inclination of the vehicle becomes greater than 0 and the liquid level in the fuel tank 21 varies greatly in climbing at an angle of inclination higher than 0, the steel ball 15 rolls under its own weight toward the evaporated fuel outlet port 13 and pushes valve body 14 to bring the spherical valve 14a of the valve body 14 into contact with the valve seat 11a to shut off the communication between the fuel tank 21 and the charcoal canister 25, thereby preventing the fuel from flowing out of the tank.

When the vehicle accelerates, the liquid surface in fuel tank 21 fluctuates greatly. But, then the steel ball rolls up over the bottom surface of the body 11 when such an acceleration may overcome the influence of its own weight acting thereon. This is because the fuel-effusion prevention valve 10 is fastened to the vehicle in such a manner that the evaporated-fuel inlet port 11 inclines downward at an angle o with respect to the horizontal axis of the vehicle. Rolling up Of the steel ball 15 pushes the valve body 14 so as to bring the spherical valve into contact with the valve seat 11a, thereby cutting off the communication between the fuel tank 21 and the charcoal canister 25 and preventing the overflow of fuel from the tank.

Here, the fuel which flows into the valve member 17 tends to cut off the communication between the fuel tank 21 and the charcoal canister 25 by means of the surface tension built up among the valve body 14, the steel ball 15 and the casing 11. Nevertheless, the steel ball 15 rolls under its own weight to push the valve body 14 so as to detach the spherical valve 14a away from the valve seat 11a, thereby releasing the interruption of communication between the fuel tank and the charcoal canister, because the fuel-effusion prevention valve 10 is fastened to the vehicle in such a manner that the steel ball 15 rolls at an angle $\theta$ with respect to the horizontal axis of the vehicle.

It is possible to fix the fuel-effusion prevention valve 10 in different directions with respect to the vehicle, whereby the direction of acceleration acting on the steel ball can be changed so as to prevent the outflow of fuel due to the fluctuation of the liquid surface in the fuel tank that may occur when the vehicle decelerates or makes a turn.

It should be understood that, although the preferred embodiment of the present invention has been described herein in considerably detail, certain modifications, changes, and adaptations may be made by those skilled in the art and that it is hereby intended to cover all modifications, changes and adaptations thereof falling within the scope of the appended claims.

What is claimed as new and desired to be secured by Letters Patent of the United States is:

1. A fuel effusion prevention valve device comprising:
   a casing fixed to a vehicle body and having an inlet port formed on a front wall thereof and an outlet port formed on a rear wall thereof for evaporated fuel, said inlet port and outlet port being disposed in the direction of an axis being slanted by a predetermined angle with respect to the horizontal direction of the vehicle body so that the inlet port is positioned downward,
   a valve body having a front wall, a rear wall and a spherical valve formed on the rear wall, said valve body being disposed in said casing so as to be movable in the direction of said slant axis for opening and closing said outlet port by said spherical valve, and
   a ball disposed in said valve body so as to be movable rollingly in the direction of said slant axis in order to move said valve body in the direction of said slant axis so that the rolling action of said ball acts to open said outlet port, thereby opening communication between said inlet port and outlet port.

2. A fuel effusion prevention valve device of claim 1, wherein a plurality of ribs is formed on the outer surface of said valve body.

3. A fuel effusion prevention valve system comprising:
   a fuel tank equipped with a filler pipe for supplying fuel,
   a ventilation pipe, one end of said ventilation pipe being positioned in the space formed in the upper portion in said fuel tank at the time of fuel storage so as to make said space to communicate with outside air,
   a charcoal canister accommodating adsorption material in its body and having a port to which another end of said ventilation pipe is connected, a port at which the suction force is introduced and a port communicated with outside air, and
   a fuel effusion prevention valve device connected to one end of said ventilation pipe in said fuel tank, said valve device comprising a casing having an inlet port formed on a front wall thereof and an outlet port formed on a rear wall thereof for evaporated fuel, said inlet port and outlet port being disposed in the direction of an axis being slanted by a predetermined angle with respect to the horizontal direction of the vehicle body so that the inlet port is positioned downward,
   a valve body having a front wall, a rear wall and a spherical valve formed on the rear wall, said valve body being disposed in said casing so as to be movable in the direction of said slant axis for opening and closing said outlet port by said spherical valve, and
   a ball disposed in said valve body so as to be movable rollingly in the direction of said slant axis in order to move said valve body in the direction of said slant axis so that the rolling action of said ball acts to open said outlet port, thereby opening communication between said inlet port and outlet port.

* * * * *